Figure 1:
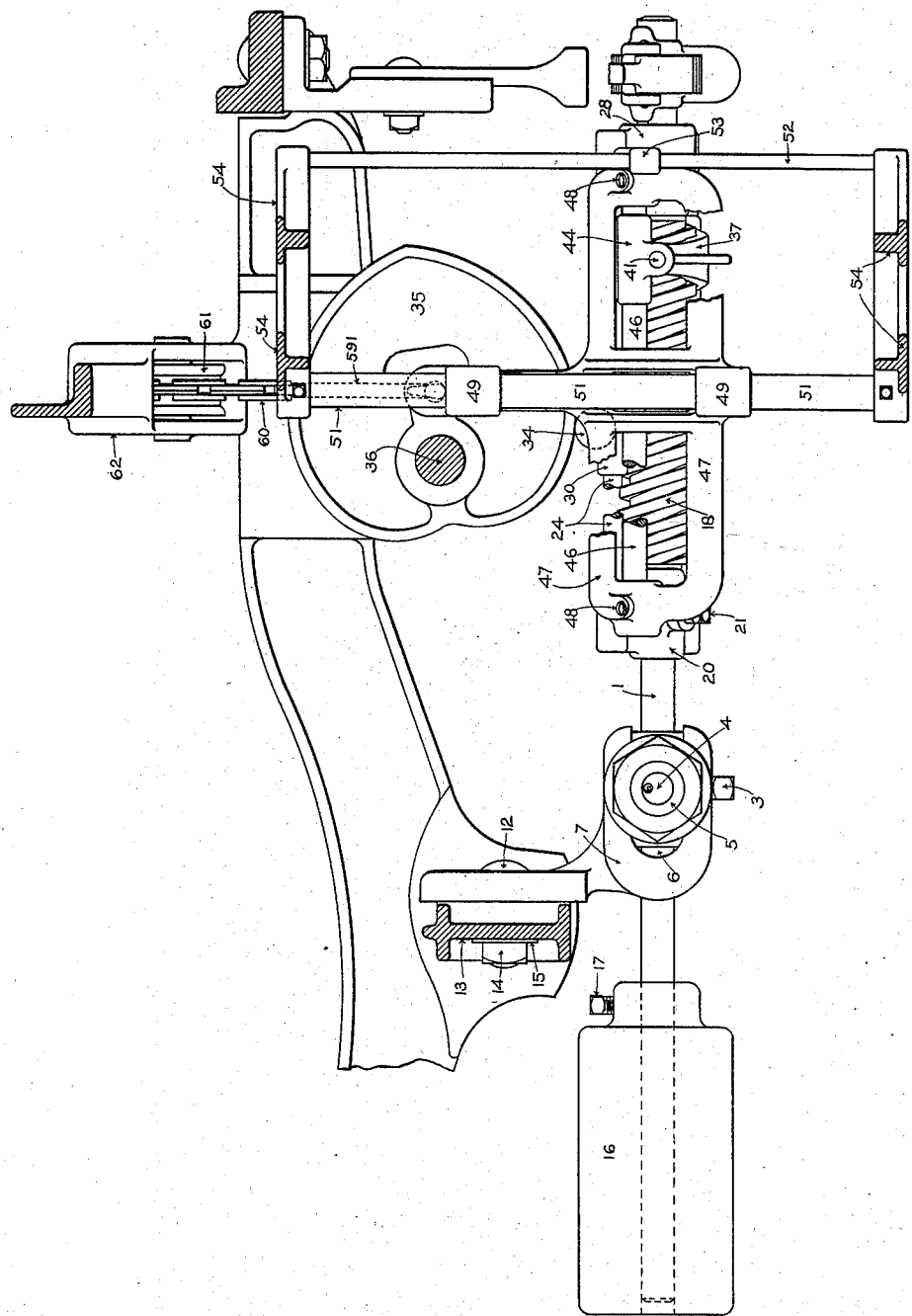

(No Model.)  5 Sheets—Sheet 1.

C. WHITAKER.
BUILDER MECHANISM FOR SPINNING FRAMES.

No. 567,930.  Patented Sept. 15, 1896.

WITNESSES.
Sam'l G. Stephens.
Mary Caverly.

INVENTOR.
Channing Whitaker.

(No Model.) 5 Sheets—Sheet 2.

C. WHITAKER.
BUILDER MECHANISM FOR SPINNING FRAMES.

No. 567,930. Patented Sept. 15, 1896.

WITNESSES.
Sam'l G. Stephens.
Mary Caverly.

INVENTOR.
Channing Whitaker.

(No Model.) 5 Sheets—Sheet 3.

C. WHITAKER.
BUILDER MECHANISM FOR SPINNING FRAMES.

No. 567,930. Patented Sept. 15, 1896.

WITNESSES.
Sam'l G. Stephens.
Mary Caverly.

INVENTOR.
Channing Whitaker.

(No Model.) 5 Sheets—Sheet 4.

C. WHITAKER.
BUILDER MECHANISM FOR SPINNING FRAMES.

No. 567,930. Patented Sept. 15, 1896.

WITNESSES.
Sam'l G. Stephens.
Mary Caverly.

INVENTOR.
Channing Whitaker.

(No Model.) 5 Sheets—Sheet 5.
C. WHITAKER.
BUILDER MECHANISM FOR SPINNING FRAMES.
No. 567,930. Patented Sept. 15, 1896.
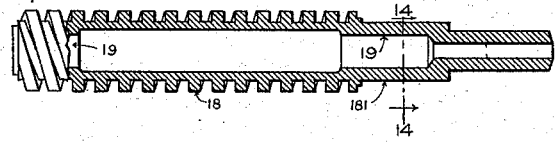 
FIG. 13. FIG. 14.
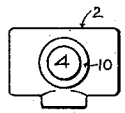 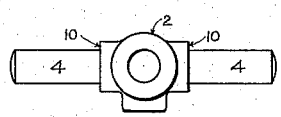 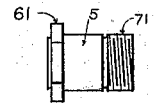
FIG. 9. FIG. 10. FIG. 11.
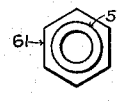
FIG. 12.
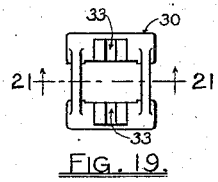 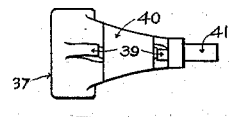
FIG. 19. FIG. 22.
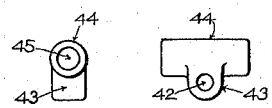
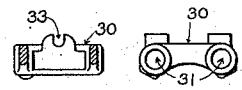 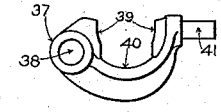
FIG. 24. FIG. 25.
FIG. 21. FIG. 20. FIG. 23.
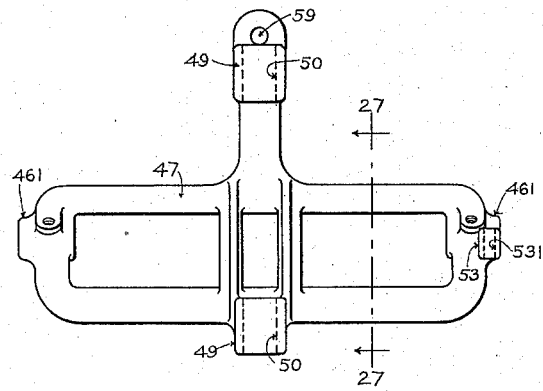 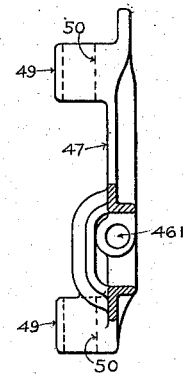 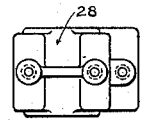
FIG. 17.
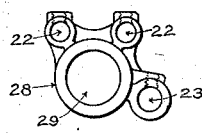
FIG. 18.
FIG. 26. FIG. 27.
WITNESSES. 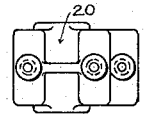 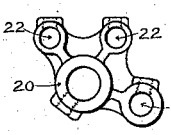 INVENTOR.
Sam'l G. Stephens. Channing Whitaker.
Mary Caverly. FIG. 15. FIG. 16.
THE NORRIS PETERS CO., PHOTO-LITHO., WASHINGTON, D. C.

UNITED STATES PATENT OFFICE.

CHANNING WHITAKER, OF TYNGSBOROUGH, MASSACHUSETTS, ASSIGNOR TO THE LOWELL MACHINE SHOP, OF LOWELL, MASSACHUSETTS.

BUILDER MECHANISM FOR SPINNING-FRAMES.

SPECIFICATION forming part of Letters Patent No. 567,930, dated September 15, 1896.

Application filed December 12, 1895. Serial No. 571,952. (No model.)

*To all whom it may concern:*

Be it known that I, CHANNING WHITAKER, a citizen of the United States, residing at Tyngsborough, in the county of Middlesex and Commonwealth of Massachusetts, have invented a certain new and useful Improvement in Builder Mechanisms for Spinning-Frames, of which the following is a specification, reference being had therein to the accompanying drawings.

Various forms of builders are employed in spinning-frames, but all those which I have met with in practice have been more or less open to objection because of their disadvantages and defects. One common fault of the builders that are in actual use is their failure to build a perfect "bobbin," as it is called. They do not so distribute the yarn as to form perfect bodies and ends to the yarn load. More particularly, in the case of builders which are constructed to build warp-wound bobbins, there is a failure to produce a perfect taper at each end of the yarn load. The bobbins which are wound with the aid thereof, instead of tapering uniformly at the ends thereof, taper irregularly. It is found on examination of the warp-wound bobbins that are wound with the aid of some of the builders now in use that, whereas each cylindrical layer of yarn should terminate at each end thereof short of the corresponding end of the last preceding layer, in point of fact some of the layers at their ends overlap previous layers, that is, extend beyond the ends of the latter. This destroys the regularity at the end of the bobbin at which the overlapping occurs and produces an imperfection at such end.

The object of my invention is to provide a builder which shall be simple in character and construction, inexpensive to make, more nearly perfect than prior forms of builders in the principles of its construction, and capable of producing a warp-wound bobbin having a perfect taper at each end of the yarn load.

The invention consists in various features of improved and novel construction and certain novel and useful combinations of parts, all as first will be described fully with reference to the accompanying drawings and afterward will be more particularly pointed out and distinctly defined in the claims at the close of this specification.

Figure 2:
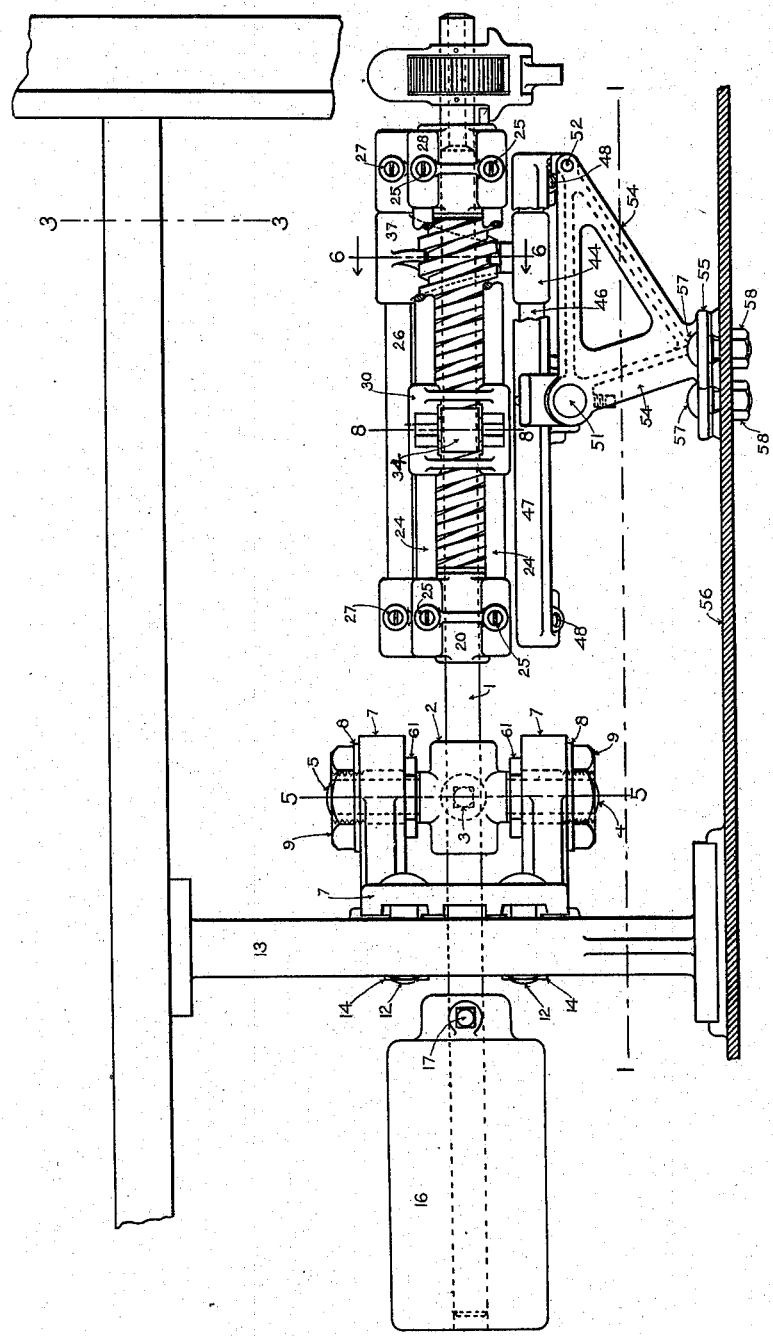
Figure 3:
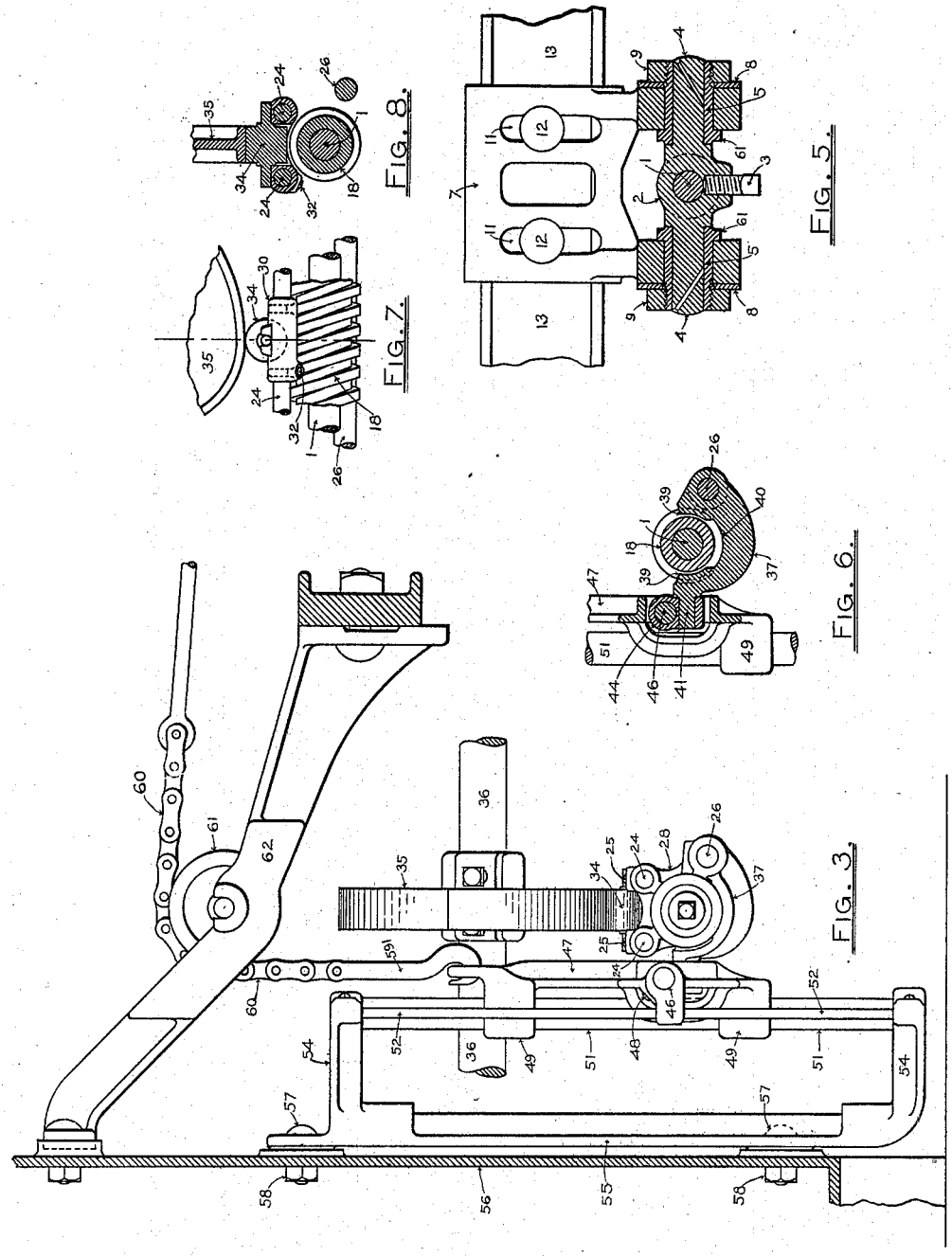
Figure 4:
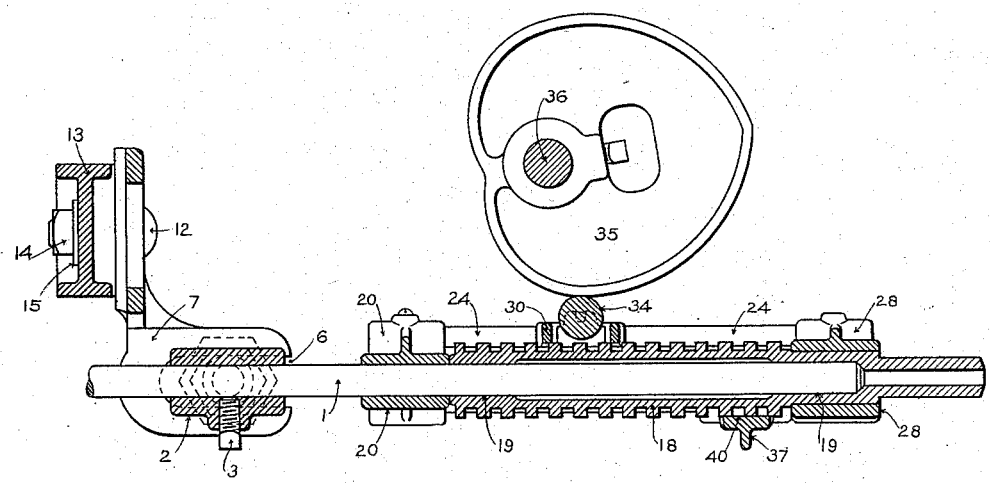

Figure 1, Sheet 1, of the drawings shows in side elevation a builder embodying my invention, certain portions of the framing of a spinning-frame being shown also, the latter being represented as in vertical section on line 1 1 of Fig. 2. In this figure certain small portions are represented as broken away for the sake of securing greater clearness. Fig. 2, Sheet 2, is a view in plan showing the said builder and certain adjacent parts of the framing. The operating-cam and its shaft and certain parts above them which are visible in Fig. 3 are omitted. Certain small portions are represented as broken away in this figure also. Fig. 3, Sheet 3, is a view looking from the right in Fig. 1, the cross-girth of the framing being in vertical section on the line 3 3 of Fig. 2. Fig. 4, Sheet 4, is a view in vertical section extending lengthwise of the builder-lever and showing also certain parts which are applied to the said builder-lever or are adjacent thereto. Fig. 5, Sheet 3, is a view in vertical section on the line 5 5 in Fig. 2, Sheet 2, looking toward the left in the latter figure. Fig. 6, Sheet 3, is a similar view on the line 6 6 of Fig. 2. Fig. 7, Sheet 3, is a view in side elevation of certain details, illustrating chiefly the engagement of the operating-cam with the roller that is carried by the builder-lever. Fig. 8, Sheet 3, is a view in transverse vertical section on line 8 8 of Fig. 2. Figs. 9 to 27, Sheet 5, show details.

1 is the builder-lever. It is in the form of a cylindrical rod and preferably consists of a length of cold-rolled shafting.

2 is a hub that is bored out so as to permit it to be slipped onto the builder-lever, it being held fast to the latter by means of a clamping-screw 3, Figs. 1 and 5. Fig. 9, Sheet 5, shows this hub, detached, in side elevation, and Fig. 10 is a view thereof at right angles to Fig. 9.

4 4 are trunnions which project oppositely from the hub 2. (See particularly Figs. 9 and 10, Sheet 5.)

5 5, Figs. 1 and 5, are bushings which fit upon the trunnions 4 4. Figs. 11 and 12, Sheet 5, show one of these bushings in two different positions. These bushings are placed in horizontal slots 6 6, Figs. 1 and 4, in the arms of the forked builder-stand 7 and constitute bearing-pieces in which the trunnions turn as the builder-lever is caused to swing in a vertical arc. Each bushing is formed at one end thereof with a flange 61 to bear against the inner side of the arm to which it is applied and the other end of the bushing is screw-threaded exteriorly at 71, Fig. 11, Sheet 4. Upon the said threaded end are slipped a washer 8 and nut 9, by which last the bushing is secured in place. The inner ends of the bushings 5 5 bear against the opposite shoulders 10 10, Figs. 9 and 10, Sheet 5, at the inner ends or bases of the journals 4 4 and thereby fix the position of the hub and builder-lever laterally. The journals projecting at opposite sides of the hub prevent the builder-lever from twisting or rocking laterally as it is vibrated under the action of its operating-cam. To enable the pivotal point of the builder-lever to be shifted horizontally to the desired point, the bushings are capable of being adjusted along the slots 6 6. To enable said pivotal point to be shifted vertically, the builder-stand 7 is slotted vertically, as at 11 11, Fig. 5, Sheet 3, in its upper portion, and bolts 12 12 are passed through the slots 11 11 and also through holes in the supporting-rail 13, the threaded ends of said bolts receiving thereon the nuts 14 14 and washers 15, Fig. 1.

16 is a counterbalancing-weight that is bored to fit upon the inner end of the builder-lever and is secured in the desired position of adjustment thereon by means of the clamping-screw 17. Upon the outer end of the builder-lever is mounted the builder-screw 18. Fig. 13, Sheet 5, shows the latter partly in side elevation and partly in longitudinal section. Fig. 14, Sheet 5, shows the same in transverse vertical section on the plane that is indicated by the line 14 14 in Fig. 13, looking in the direction indicated by the arrows at the ends of such line in the latter figure. The sectional view, Fig. 4, Sheet 4, shows the builder-screw applied to the builder-lever. The said screw is hollow to enable it to fit upon and surround the outer end of the builder-lever, and is formed with interior bearings at 19 19, Figs. 4, 13, and 14, which contact with the exterior cylindrical surface of the builder-lever. This mode of applying the builder-screw to the builder-lever provides for the support of the former in simple and convenient manner and dispenses with the necessity for other bearings for the builder-screw. The extreme outer end of the builder-screw is reduced to receive thereon the ratchet-wheel of a suitable feed-motion whereby the builder-screw is rotated intermittingly in the usual manner. I have shown, but not described, the said ratchet-wheel and the remaining parts of the said feed-motion, because they are of well-known character, and the manner of their application to the devices of the present case will be obvious to all who are skilled in the art without explanation herein. Reference may be made in this connection to the United States Patent to J. Scott, No. 158,530, granted January 5, 1875, which shows a feed-motion combined with the builder-screw of a builder for ring-spinning frames.

One advantage of forming the builder-lever of cold-rolled shafting is that the latter requires no preparation to fit it to receive the hollow builder-screw upon it, or for the rotation of the latter upon its exterior; also it requires none to fit it for the reception of hub 2 and of the inner saddle 20, which is mentioned hereinafter. However, it is not necessary in all embodiments of my invention using a hollow builder-screw that the builder-lever should be formed of a cylindrical rod, provided it is formed on its outer portion where it receives the builder-screw in proper manner to permit of the latter being slipped and rotated thereupon.

Mounted upon the builder-lever 1, at the inner end of the builder-screw 18, is what I term the "inner" saddle 20, which is shown detached in plan in Fig. 15, Sheet 5, and in side elevation at Fig. 16. This inner saddle is bored out to fit upon the builder-lever and is fixed in the desired position thereon by the clamping-screw 21, Fig. 1. It also is bored out to form the sockets 22, 22, and 23. Into the sockets 22 22, at the top of the inner saddle, are introduced the inner ends of rods 24 24, the said ends being held fast in the said sockets by means of the clamping-screws 25 25, Fig. 2. The socket 23, at the side of the inner saddle, receives the inner end of a rod 26, which is held fast therein by a clamping-screw 27. A similar saddle 28, called by me the "outer" saddle, is mounted upon the outer end 181 of the builder-screw 18, beyond the thread thereof. This saddle is shown detached in Figs. 17 and 18, Sheet 5, the former of which represents it in plan and the latter in side elevation. It is formed with sockets 22, 22, and 23, which receive the outer ends of the rods 24, 24, and 26, the said ends being made fast in the said sockets by means of clamping-screws 25, 25, and 27, as shown in Fig. 2. The connection of the outer saddle to the rods 24, 24, and 26 maintains the said saddle in place on the plain cylindrical outer end of the builder-screw, which turns within the bore 29 of the saddle, and also holds the builder-screw from moving lengthwise outwardly upon the builder-lever. The said rods preferably are formed of lengths of cold-rolled shafting; but this is of greater importance in the case of rod 26, which constitutes a slide-rod upon which the builder-nut slides to and fro.

30 (see more particularly Fig. 2, Sheet 2; Fig. 7, Sheet 3; Fig. 4, Sheet 4, and Figs. 19, 20, and 21, Sheet 5) is a small stand that is bored to form sockets 31 31, Fig. 20, Sheet 5, to receive the rods 24 24, which are passed therethrough. Fig. 19 shows the said stand in plan, Fig. 20 shows it in side elevation, and Fig. 21 shows it in section on line 21 21, Fig. 19. The said stand is fixed upon the said rods at the desired point in the length of the latter by clamping-screws 32, one of which is shown in Figs. 7 and 8, Sheet 3. It is provided with bearings at 33 33, Figs. 19 and 21, Sheet 5, for the reception of the journals of a roller 34.

35 is the operating-cam for the builder-lever, it being fast upon the rotating shaft 36 and acting upon the roller 34. The said cam in its movement occasions the vibration of the builder-lever, substantially as usual in builders for ring-spinning frames. It is to be observed that the rods 24 24, upon which the stand 30 is mounted, are located above the builder-lever and builder-screw on opposite sides of the middle line of the builder-lever and equidistant from the said middle line; also that the middle of the width of the cam 35 is in the same vertical plane with the said middle line of the builder-lever. From this symmetrical arrangement of the parts it results that as the cam rotates it acts upon the builder-lever without any tendency to twist the latter in a sidewise direction.

37 is what I term the "builder-nut." It is shown in place in the mechanism in Figs. 1, 2, 3, and 6 and detached in Figs. 22 and 23, Sheet 5. Fig. 22 represents it in plan and Fig. 23 in side elevation. It is bored transversely at 38 to enable it to fit upon rod 26, along which it is intended to slide, and is provided with projecting portions 39 39 to enter between the turns of the thread of the builder-screw 18 at opposite sides of the latter, as indicated clearly in Figs. 2 and 6. The builder-nut 37 is hollowed out between the projections 39 39 to receive the body of the builder-screw, and the concave portion 40 thereof bears against the exterior of the thread of the builder-screw, as shown clearly in Figs. 3 and 6. The free extremity of the builder-nut is reduced and given the form of a cylindrical pin 41, which latter enters the hole 42, that is formed in the depending portion 43 of the cross-slide 44. The said cross-slide is shown in place in the mechanism in Figs. 1, 2, and 6 and separately in Figs. 24 and 25, Sheet 5, Fig. 24 showing an end view thereof and Fig. 25 a side view. It is bored at 45 to fit upon the slide-rod 46, Figs. 1, 2, 3, and 6, which latter has its ends fitted to sockets 461 461 at the opposite sides of what I term the "main slide" 47 and secured therein by clamping-screws 48 48. The said cross-slide is free to swing upon the slide-rod 46 and accommodate itself automatically to the position of the pin 41. Thereby is obviated all tendency to bind. As the parts wear in use and the fit between the pin 41 and hole 42 tends to become less perfect throughout the length of the pin the downward pressure of the pin within the said hole 42 causes the cross-slide to swing into an inclined position, thereby bringing the opposite ends of the hole into close bearing against the upper and lower sides of the pin. The said main slide is shown detached in side elevation in Fig. 26, Sheet 5. Fig. 27, Sheet 5, shows the same in vertical section on the line 27 27 of Fig. 26, looking in the direction indicated by the arrows adjacent to the ends of such line. The said main slide is formed at mid-width thereof with upper and lower bearing portions 49 49, which are bored, as indicated at 50 50 in dotted lines in Figs. 26 and 27, to fit upon the vertically-arranged main slide-rod 51. A supplemental slide-rod 52 is employed at one side of the main slide-rod 51 for the purpose of steadying the main slide 47, which latter is provided with a bearing portion 53, that is bored, as indicated in dotted lines at 531 in Fig. 26, to fit upon the said supplemental slide-rod 52. The slide-rods 51 and 52 are secured in and supported by the laterally-projecting portions 54 54 of a stand 55, that is held to the end plate 56 of the spinning-frame by bolts 57 57, the latter being provided with nuts 58 58.

59 is a hole in the upwardly-projecting portion at the middle of the main slide 47, the said hole receiving a hook 591, that is attached to one end of a chain 60. Chain 60 passes over a chain-sheave or pulley 61, which is mounted in bearings on the girth 62, Figs. 1 and 3, and thence extends to and is connected with the usual devices which more immediately are concerned in supporting and actuating the ring-rails. The parts (not shown) which are connected with and actuated by the chain 60 transmit, through the said chain, a pull which draws the main slide 47 upwardly. Through the engagement of the cross-slide 44 (carried by the slide-rod 46, mounted in the main slide 47) with the cylindrical pin 41 of the builder-nut 37 the latter is borne upwardly, so as to hold its concave portion 40 pressed against the exterior of the thread of the builder-screw 18 at the under side of the latter, and also with a tendency to press the builder-screw and builder-lever upwardly and bear the roller 34 against the periphery of cam 35, this tendency being supplemented to the requisite extent by the counterweight 16. The builder-nut 37 swings freely upon the rod 26. In consequence of the described arrangement of parts it follows that the pressure is transmitted directly between the surface of the builder-screw and the surface of the concave portion of the builder-nut, which is below the same. The contact of the said surfaces occasions a frictional resistance to the rotation of the builder-screw, which prevents undesired or accidental shift of the builder-screw. There is nothing to cause the builder-nut to bind in the thread of the builder-screw, and heat. In assembling the parts they preferably are so put together that a plane intersecting the axis of rotation of the builder-lever, and passing transversely through the longitudinal axis of the latter, also passes through the axis of the pin 41 of the builder-nut. The builder-nut swings around the guide-rod 26 in a direction at right angles to the length of the builder-lever. Hence, as wear occurs, the swinging movement of the builder-nut which thereby is permitted to take place occurs in a plane at right angles to the radial line of the builder-lever and occasions no displacement of the axis of the pin 41 lengthwise of the builder-lever. From this it results that the axis of the said pin moves to exactly the same distance in each movement of the builder-lever, even after wear takes place, as the point in the longitudinal axis of the builder-lever which is contained in the same plane as the axis of said pin, and that the length of the arc which is described by the said pin always is exactly proportional to the radial distance of the said plane from the pivotal axis of the builder-lever. Since the pin 41 of the builder-nut is adjusted along a radial line, or a line parallel therewith, and since the extent of each vertical movement of the main slide 47 is exactly equal to the vertical component of the movement of the pin, it follows that the movement of the builder-nut which is occasioned by the intermittent rotation of the builder-screw, from the position in which the said builder-nut is shown in Fig. 1 toward the pivotal point of the builder-lever, not only occasions a regular progressive reduction in the lengths of the successive traverses of the main slide 47, but causes each cylindrical layer of yarn that is wound on a bobbin to terminate at each end thereof short of the corresponding end of the last preceding layer. In order that both ends of the yarn load may be wound with precisely the same taper, the pivotal support of the builder-lever should be located, as shown, in a plane bisecting at right angles the distance between the highest and lowest positions of the builder-lever. The builder-lever will then move to equal distances above and below this plane. By adjusting stand 7 up or down to the required extent the opposite ends of the bobbins may be given different degrees of taper, which may vary from each other to any desired extent.

I claim as my invention—

1. The combination, in a builder for spinning-frames, with a builder-lever consisting of a rod, means to vibrate said lever, and motion-transmitting devices actuated by said lever of a pivotal mounting for said rod consisting of a hub having an opening therethrough to fit upon said rod secured in place thereon and provided with opposite trunnions having shoulders at the inner ends of the latter, a supporting-stand, and bushings applied to the said stand, receiving within them the said trunnions, and engaging at their inner ends with the said shoulders, substantially as described.

2. The combination, in a builder for spinning-frames, with a builder-lever consisting of a rod, of a pivotal mounting therefor consisting of a hub secured upon said rod and provided with opposite trunnions having shoulders at the inner ends of the latter, a supporting-stand, bushings applied to the said stand, receiving within them the said trunnions, and engaging at their inner ends with the said shoulders, and means to adjust the said bushings on the said stand lengthwise of the builder-lever, substantially as described.

3. The combination with a builder-lever provided with opposite trunnions having shoulders at the inner ends of the latter, and a supporting-stand, of bushings applied to the said stand, receiving within them the said trunnions, and engaging at their inner ends with the said shoulders, means to adjust the said bushings on the said stand lengthwise of the builder-lever, and means to adjust the said stand vertically, substantially as described.

4. The combination with a builder-lever consisting of a rod, means to vibrate the said builder-lever, and variable motion-transmitting devices actuated by the said lever, of a hub having an opening therethrough to fit upon the said lever and secured in place thereon, and a support on which the said hub is mounted pivotally, substantially as described.

5. The combination, in a builder for spinning-frames, with an operating-cam, of a builder-lever, the hollow builder-screw surrounding the outer end of the builder-lever and rotating upon the exterior thereof, a device to receive the action of the said cam, a builder-nut engaged by the said builder-screw, means to support the said device and builder-nut on the builder-lever, and means to transmit movement from the said builder-nut as the builder-lever vibrates, substantially as described.

6. The combination, in a builder for spinning-frames, with an operating-cam, of a builder-lever consisting of a cylindrical rod, a pivotal mounting therefor, the hollow builder-screw surrounding the outer end of the builder-lever and rotating upon the exterior thereof, a device to receive the action of the said cam, a builder-nut engaged by the said builder-screw, means to support the said device and builder-nut on the said builder-lever, and means to transmit movement from the said builder-nut as the builder-lever vibrates, substantially as described.

7. The combination, in a builder for spinning-frames, with an operating-cam, of the builder-lever of cylindrical form, a pivotal mounting therefor, the hollow builder-screw surrounding the outer end of said lever and rotating upon the exterior thereof, the inner saddle mounted on the builder-lever at the inner end of the builder-screw, the outer saddle, the rods extending from one saddle to the other, the roller supported by certain of such rods and acted upon by the said cam, the builder-nut supported by another of such rods and sliding upon the same, the cross-slide engaged by the said builder-nut, the main slide, and means for supporting and guiding said cross-slide on said main slide, substantially as described.

8. The combination, in a builder for spinning-frames, with an operating-cam, of a builder-lever, the builder-screw carried by the said builder-lever, a slide-rod moving with the builder-lever, a builder-nut mounted upon the said slide-rod and formed with oppositely-located projections to enter between the turns of the builder-screw on opposite sides of the latter, and also with a surface to bear against the exterior of the thread of the builder-screw between such projections, and transmitting devices operated by the said builder-nut, substantially as described.

9. The combination, in a builder for spinning-frames, with an operating-cam, of the builder-lever of cylindrical form, a pivotal mounting therefor, the hollow builder-screw surrounding the outer end of said lever and rotating upon the exterior thereof, the inner saddle mounted on the builder-lever at the inner end of the builder-screw, the outer saddle, the rods extending from one saddle to the other, the roller supported by certain of such rods and acted upon by the said cam, the builder-nut mounted to slide upon another of such rods and formed with oppositely-located projections to enter between the turns of the builder-screw on opposite sides of the latter, and also with a surface to bear against the exterior of the thread of the builder-screw between such projections, the cross-slide engaged by the said builder-nut, the main slide, and means to support and guide said cross-slide on said main slide, substantially as described.

10. The combination, in a builder for spinning-frames, with an operating-cam, of the builder-lever, the builder-screw carried thereby, the builder-nut, the main slide, the cross-slide operatively connected with the said builder-nut, and means to support said cross-slide in said main slide with capacity to accommodate itself to variations in the angular position of the said builder-nut, substantially as described.

11. The combination, in a builder for spinning-frames, with an operating-cam, of the builder-lever, the builder-screw carried thereby, the builder-nut having a pin 41, the main slide, the slide-rod 46 supported by the said main slide, and the cross-slide mounted on said slide-rod and adapted to swing around the same, and also having a depending portion which is formed with a hole receiving said pin 41, substantially as described.

In testimony whereof I affix my signature in the presence of two witnesses.

CHANNING WHITAKER.

Witnesses:
SAML. G. STEPHENS,
MARY CAVERLY.